US007881922B2

(12) United States Patent
Fletcher et al.

(10) Patent No.: US 7,881,922 B2
(45) Date of Patent: Feb. 1, 2011

(54) COMMUNICATION DEVICE AND METHOD TO DERIVE CONTEXT INFORMATION

(75) Inventors: Ben J Fletcher, Huddersfield (GB); Daniel E Would, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 11/530,309

(22) Filed: Sep. 8, 2006

(65) Prior Publication Data

US 2007/0244946 A1    Oct. 18, 2007

(30) Foreign Application Priority Data

Jan. 4, 2006    (GB) ................. 0600056.6

(51) Int. Cl.
*G06F 17/28* (2006.01)
(52) U.S. Cl. .................. 704/3; 704/270; 704/270.1
(58) Field of Classification Search .......... 704/270, 704/231, 270.1, 3, 4, 7, 276, 272; 701/211
See application file for complete search history.

(56) References Cited

U.S. PATENT DOCUMENTS

| 5,938,721 | A | 8/1999 | Dussell et al. |
|---|---|---|---|
| 6,177,905 | B1 | 1/2001 | Welch |
| 6,278,944 | B1 | 8/2001 | Lui et al. |
| 6,360,167 | B1 * | 3/2002 | Millington et al. .......... 701/211 |
| 6,411,899 | B2 | 6/2002 | Dussell et al. |
| 6,446,004 | B1 | 9/2002 | Cao et al. |
| 6,513,046 | B1 | 1/2003 | Abbott, III et al. |
| 7,024,364 | B2 * | 4/2006 | Guerra et al. ............... 704/270 |
| 2005/0021369 | A1 | 1/2005 | Cohen et al. |

* cited by examiner

*Primary Examiner*—Huyen X. Vo
(74) *Attorney, Agent, or Firm*—David A. Mims, Jr.; Jonathan E. Jobe

(57) ABSTRACT

A communication device comprises processing means, storage means for storing a database of language components, display means and user interface means. The processing means is arranged to determine at least one qualifier, to access the database, and to select at least one language component according to the at least one determined qualifier, and the display means is arranged to display the at least selected language component. A user can select a displayed language component, and this can be outputted as an audio or wireless signal.

17 Claims, 5 Drawing Sheets

COMMUNICATION DEVICE AND METHOD TO DERIVE CONTEXT INFORMATION

BACKGROUND

1. Technical Field

This invention relates to a communication device and to a communication method. The device and method derive relevant context information for intelligent sentence selection, using location and other qualifiers.

2. Description of Related Art

Communication is everywhere, for example, "I would like a hamburger please," or "I would like a single ticket to London please." The use of such simple phrases is taken for granted by most people most of the time, as it forms an essential part of our lives. However, for some people, simple communication does not come so easily. One reason for such problems in simple communication is disability, being deaf, blind or mute, each of which can be a major barrier to easy communication and in combination can make everyday situations very challenging. Another reason that communication can be difficult is simply a language barrier, which occurs when attempting to communicate with someone who does not speak your language.

Two known solutions to these problems exist. Firstly, an individual who has difficulty communicating through disability or language problems can get someone who is fluent in the desired language to act as a middleman. This solution has a number of problems, notably, that such an intermediary is not always available, it is inconvenient, sometimes awkward, and can be annoying and/or embarrassing for all of the parties involved in such an exchange.

A second solution is the use of a voice synthesizer. A synthesizer allows a user to type in a language component as desired, and the synthesizer will then output, in audio, the typed language component. This solution also has problems, because it requires a perfect knowledge of the desired language, and the use of a synthesizer requires the time and effort in typing the language component, which can be, again, annoying and/or embarrassing for both parties. This also does nothing to address communication back in the other direction.

It is therefore an object of the invention to improve upon the known art.

SUMMARY

According to a first aspect of the present invention, there is provided a communication device comprising processing means and storage means for storing a database of language components, wherein the processing means is arranged to determine at least one qualifier, to access the database, and to select at least one language component according to the or each determined qualifier.

According to a second aspect of the present invention, there is provided a method for execution by a communication device, the method comprising the steps of determining at least one qualifier, accessing a database of language components, and selecting at least one language component according to the or each determined qualifier.

According to a third aspect of the present invention, there is provided a computer program product on a computer readable medium comprising instructions for determining at least one qualifier, accessing a database of language components, and for selecting at least one language component according to the or each determined qualifier.

Owing to the invention, it is possible to provide a device that will automatically provide a user with a selection of language components (usually sentences) that are appropriate to the context in which the user is placed. No input is required from the user. This invention provides solutions with a common foundation to address situations covering a broad range of people in this world of globalization, including workers from abroad, tourists, the deaf and hard of hearing, and people with speech difficulty.

An embodiments of the present invention provides a method and system for generating a list of context-relevant sentences based on available qualifiers, information, and user preferences. By intelligently producing a targeted list of 'context relevant' choices, the system provides the user with an instant method of selecting sentences that are appropriate to their current situation. Where necessary a similar set of context relevant responses that the other party can select can also be provided.

Preferably the device is provided with display means, the display means being arranged to display at least one selected language component. The user can see the selected language components and can review them and choose one to speak. The output of the communication device need not be displayed directly by the device, but may be transferred for use by another device that a user has access to, such as a mobile phone, or a Braille device that can represent the list of selected language components.

Advantageously, the device further comprises location determining means, the processing means being arranged to define a qualifier according to the output of the location determining means. By determining the location of the communication device, and thereby the user, a qualifier can be constructed for filtering the language components that will provide a very good chance of matching the selected components to the environment and situation that the user is presently experiencing.

Similarly, the communication device preferably further comprises a clock, the processing means being arranged to define a qualifier according to the output of the clock. The determination of a qualifier according to the present time will increase the likelihood of selecting one or more language components that the user will wish to use.

Ideally, the device further comprises audio output means, the audio output means arranged to output an audio signal corresponding to a language component, in response to a user input at user interface means. If the device is equipped with an audio capability, then the user, via the user interface, which may be a keypad or touch screen, can select one of the language components that are displayed, and this can be outputted as an audio signal.

Advantageously, the communication device further comprises wireless transmitting means, the wireless transmitting means arranged to output a wireless signal corresponding to a language component, in response to a user input at the user interface means. The wireless functionality of the device supports the device bypassing any need for the user to interact with another person. For example, the device could be used in an environment where a signal sent via a short range wireless communication link can be received and understood by another device. This might be used for ordering in a restaurant or buying a travel ticket or the like.

Preferably, the processing means is further arranged, when selecting a plurality of language components, to order the language components according to at least one predetermined parameter. The ordering of the language components assists the user to make their choice from all of the displayed language components. The ordering may be according to most used components, or most used components at a particular location or any such similar ordering that will present the user with the components that they are most likely to want to use at that particular time, with the most likely presented first in a suitably short list of, for example, five possible language components.

BRIEF DESCRIPTION OF THE DRAWINGS

Embodiments of the present invention will now be described, by way of example only, with reference to the accompanying drawings, in which.

DETAILED DESCRIPTION OF EXEMPLARY EMBODIMENTS

Figure 1:
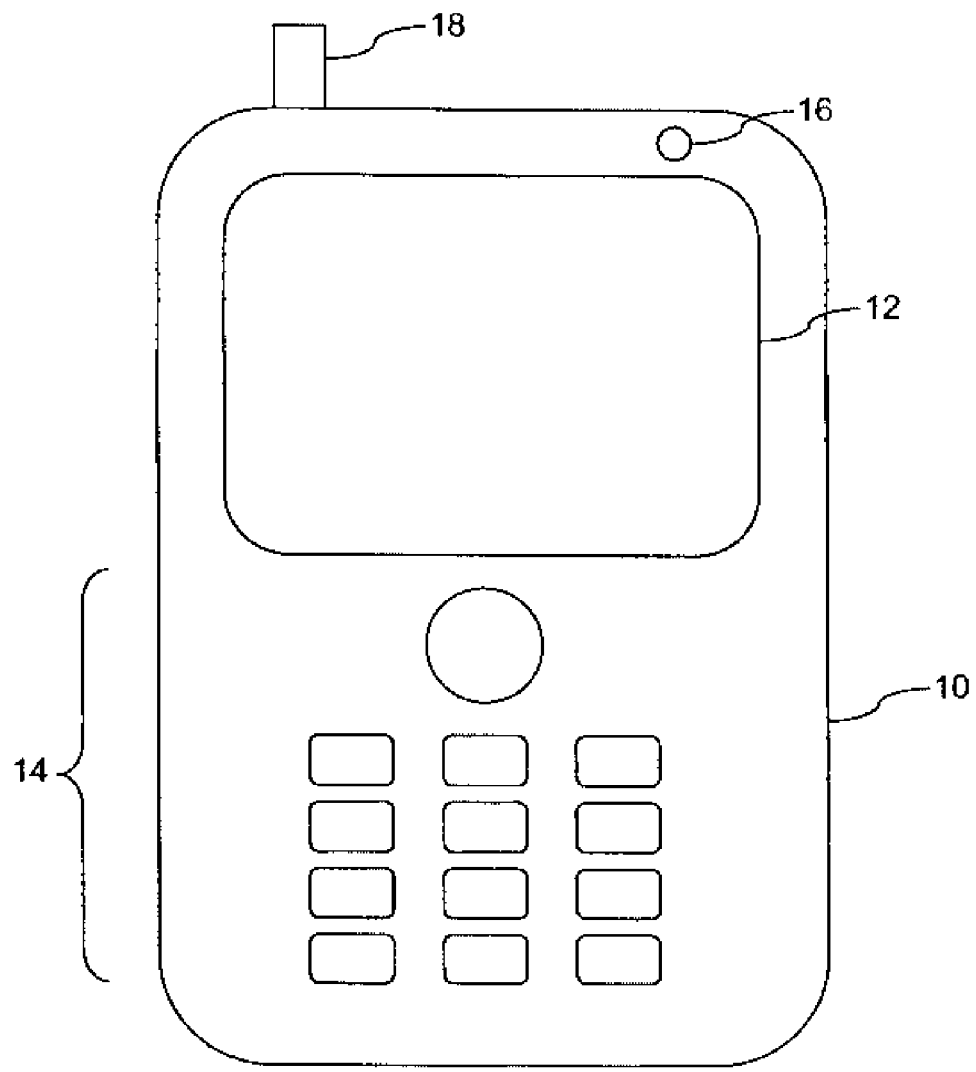
FIG. 1 is a front view of a communication device.

FIG. 1 shows a communication device 10 with display means 12, user interface means 14, audio output means 16 and wireless transmitting means 18. The device 10 can be a purpose built handheld device, for providing the user with language components (sentences), or could be a simple mobile phone or pda (personal digital assistant) that has been adapted to carry out the method of providing the user with the choice of various appropriate sentences.

Figure 2:
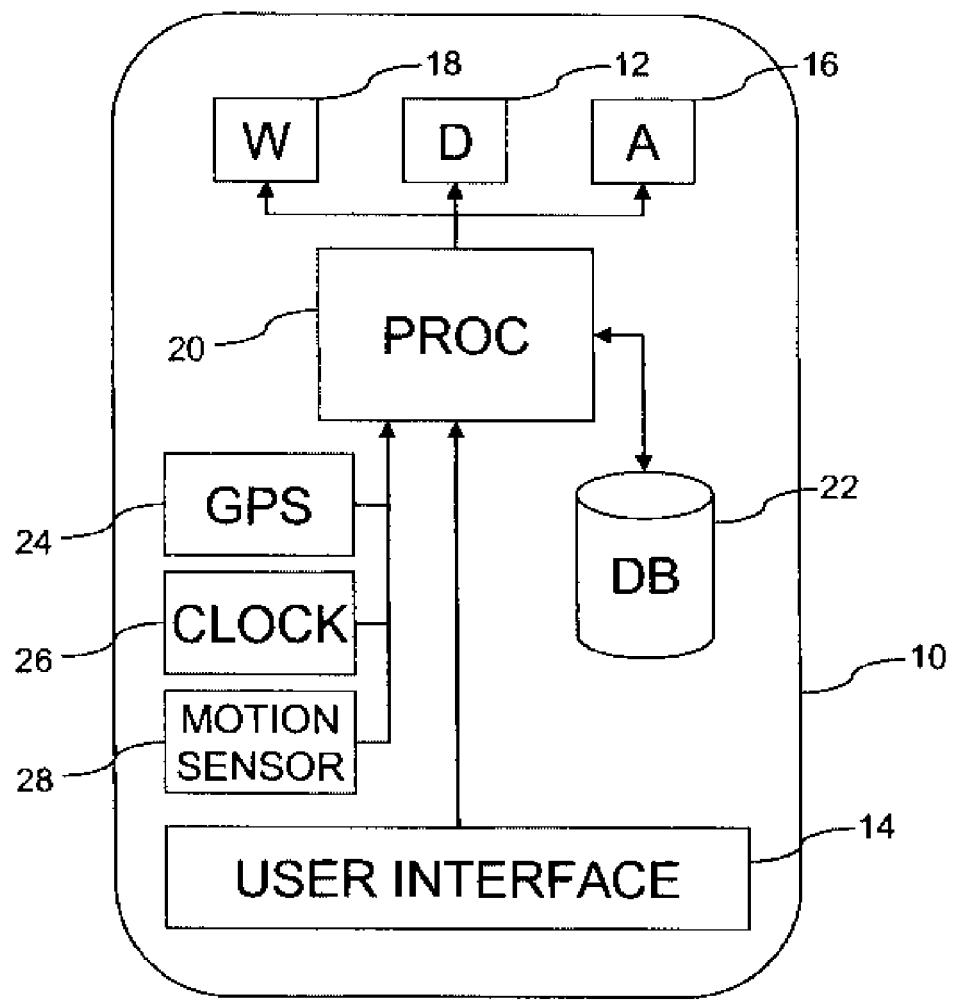
FIG. 2 is a schematic view of the components of the communication device of FIG. 1.

FIG. 2 shows, schematically, the components in the communication device 10. In addition to the display means 12, user interface means 14, audio output means 16 and wireless transmitting means 18, the device has processing means 20, storage means 22, location determining means 24, a clock 26 and a motion sensor 28. Other sensing devices can be provided in the device, according to the level of functionality desired by the user. The various different functions of the device are shown separately for ease of understanding, but in conventional technology, many of the functions will by provided by a single piece of dedicated hardware such as an Application Specific Integrated Circuit (ASIC), or a general purpose Integrated Circuit (IC) running software will execute the tasks.

The purpose of the device 10 is to assist a user in communicating, when they are in a situation where communication is difficult. As discussed above, this could be because the user has traveled to a country where they are not familiar with the spoken language of that country, or could be because the user has a disability that makes communication in some situations difficult. The device 10 will provide the user, via the display means 12, with a selection of language components that the device believes are relevant to the present environment in which the user is placed.

Figure 3:
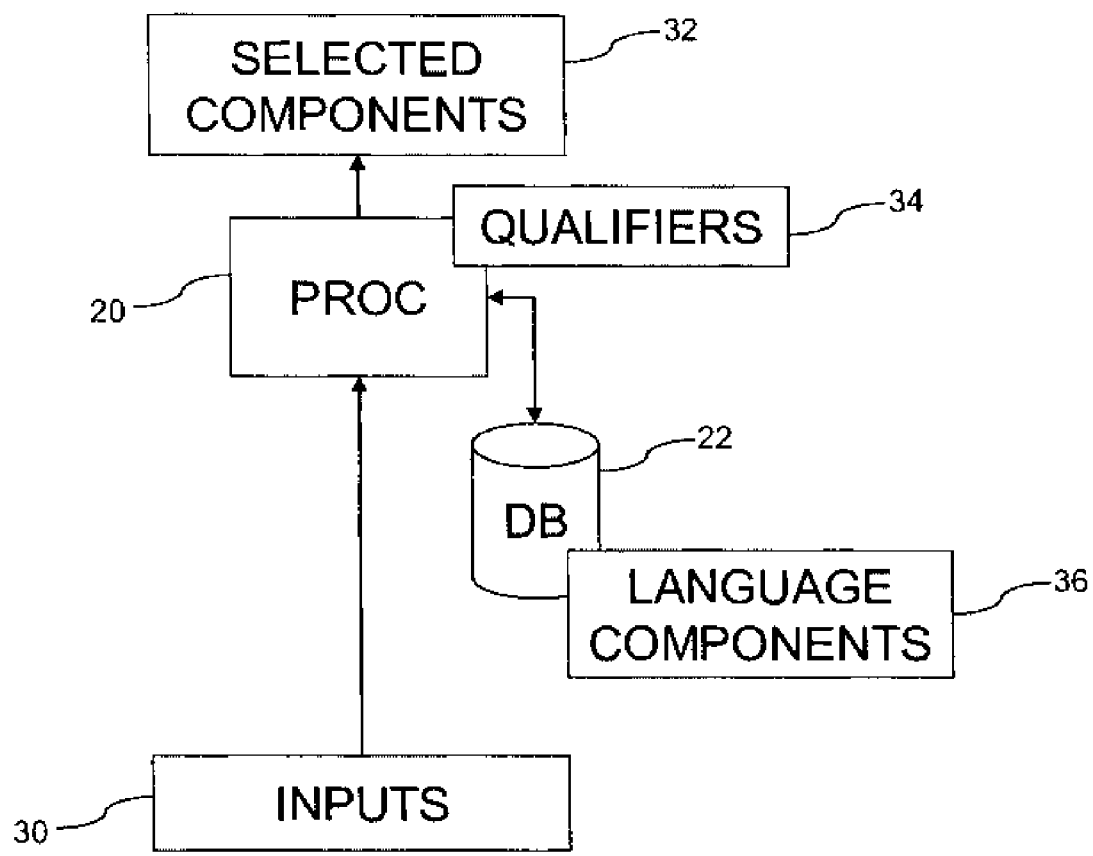
FIG. 3 is a schematic diagram of the data flow through a processor of the communication device.

FIG. 3 shows, schematically, the flow of information around the device 10. The processing means 20 can access the storage means 22, which stores a database of language components 36. This database will contain many thousands of language components, including simple sentences such as "Where is nearest hotel please?" to more complicated language constructions that use variables such as "I would like a {x} ticket to {y} please.".

The device 10 can provide the user with a list of suitable language components 36 on demand, or can be continually providing a changing list of sentences that the user can look at, as and when they feel that they need assistance. The processor 20 has to filter the very long list of language components 36 down to a small number of suitable components appropriate to the user's context, which may be indoors at a restaurant or retail outlet, or outdoors at a transport terminus such as a railway station or bus stop.

In order to create the list of components 36 (which may comprise only a single selected component) the processing means 20 is arranged to determine at least one qualifier 34. The qualifier(s) 34 is/are used to subsequently filter the database 22 of language components 36. The location determining means 24, shown in FIG. 2 as a GPS (Global Positioning System) unit, can identify accurately the location of the user, and the processing means 20 is arranged to define a qualifier 34 according to the output of the location determining means 24. Likewise, the clock 26 can be used by the processing means 20 to define a qualifier 34 according to the output of the clock 26.

In FIG. 3, the outputs of the various sensing devices are summarised by the inputs 30, which provide varied and detailed information to the processor 20, for the processor 20 to define the various qualifiers 34. The qualifiers 34 need not be especially complicated. For example, the processor 20, from the output of the GPS unit 24 may define the location qualifier as "A" for food outlet, with "A1" being fast food restaurant, "A2" being sandwich shop etc. "B" could be retail outlet, "B1" being clothes shop and "C" could be transport terminus etc.

Once the processor 20 has defined one or more qualifiers 34, the processor 20 is arranged to access the database 22, and to select at least one language component 32 according to the determined qualifier(s) 34. The language components 36 are organised within the database 22 with associated data that defines the possible contexts in which the corresponding component may be used. For example, the language component "I would like a ham sandwich please." would have the data "A2" attached in respect of location.

The processor 20 will filter the database 22, in a preferred embodiment, using all of the qualifiers 34 that are available, as this will produce the shortest list of possible language components 36. However, other qualifier strategies are possible, for example using a single qualifier 34 such as location, or having an adaptive determination of qualifiers according to a user profile stored by the device 10.

Following selection of the language components 32 that the processor 20 has determined are most likely to be relevant to a user, then the display means 12 is arranged to display each selected language component 32, or just the single selected component 32 if there is only one returned by the processor 20.

The processing means 20 is further arranged, advantageously, when selecting the plurality of language components 32 for display, to order the language components 32. The ordering is according to at least one predetermined parameter. The ordering may be based upon prior selection by a user, or a user profile, or the device 10 may itself decide which is the most likely sentence for the user to wish to use based upon the comparison of the qualifiers 34 with the data associated with the selected components 32.

Figure 4:
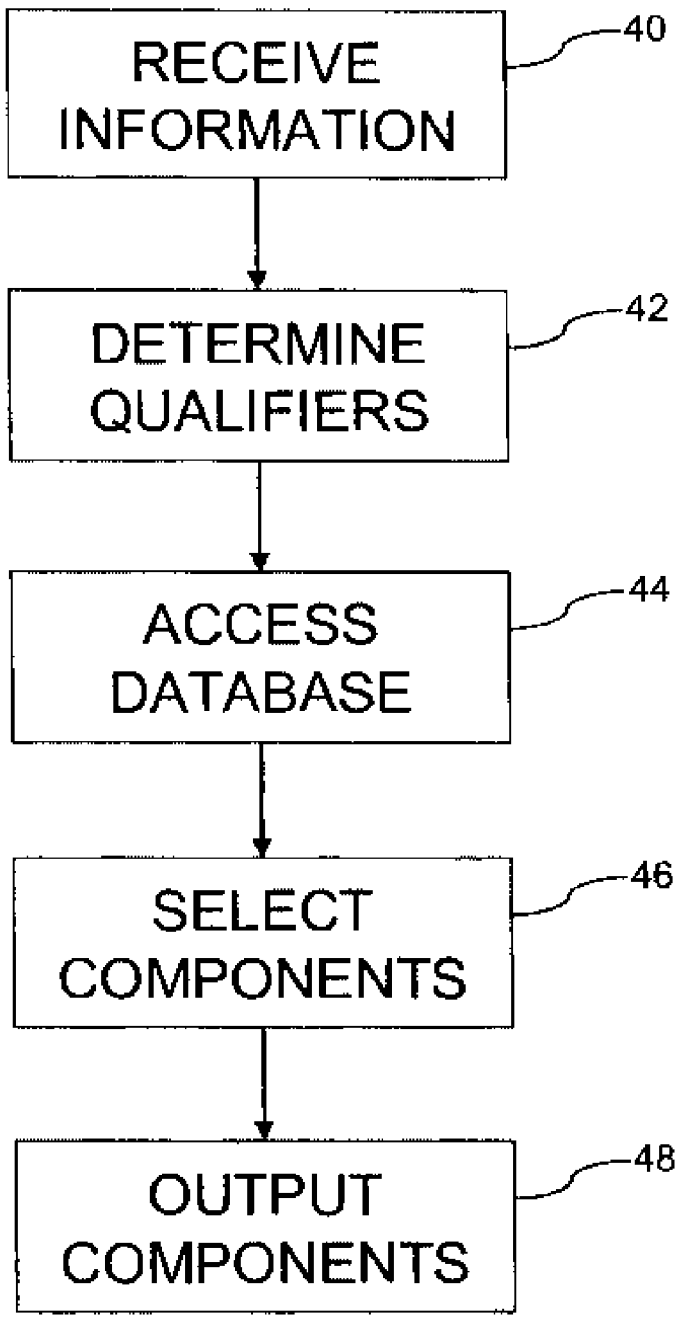
FIG. 4 is a flow diagram of a communication method.

FIG. 4 summarises the method carried out by the device 10. The first step 40 is to receive information from such devices as the location determining means 24. This is followed by the step 42 of determining at least one qualifier 34, the step 44 of accessing the database 22 of language components 36, the step 46 of selecting at least one language component 32 according to each determined qualifier, and finally step 48 of outputting as a display each selected language component 32.

Figure 5:
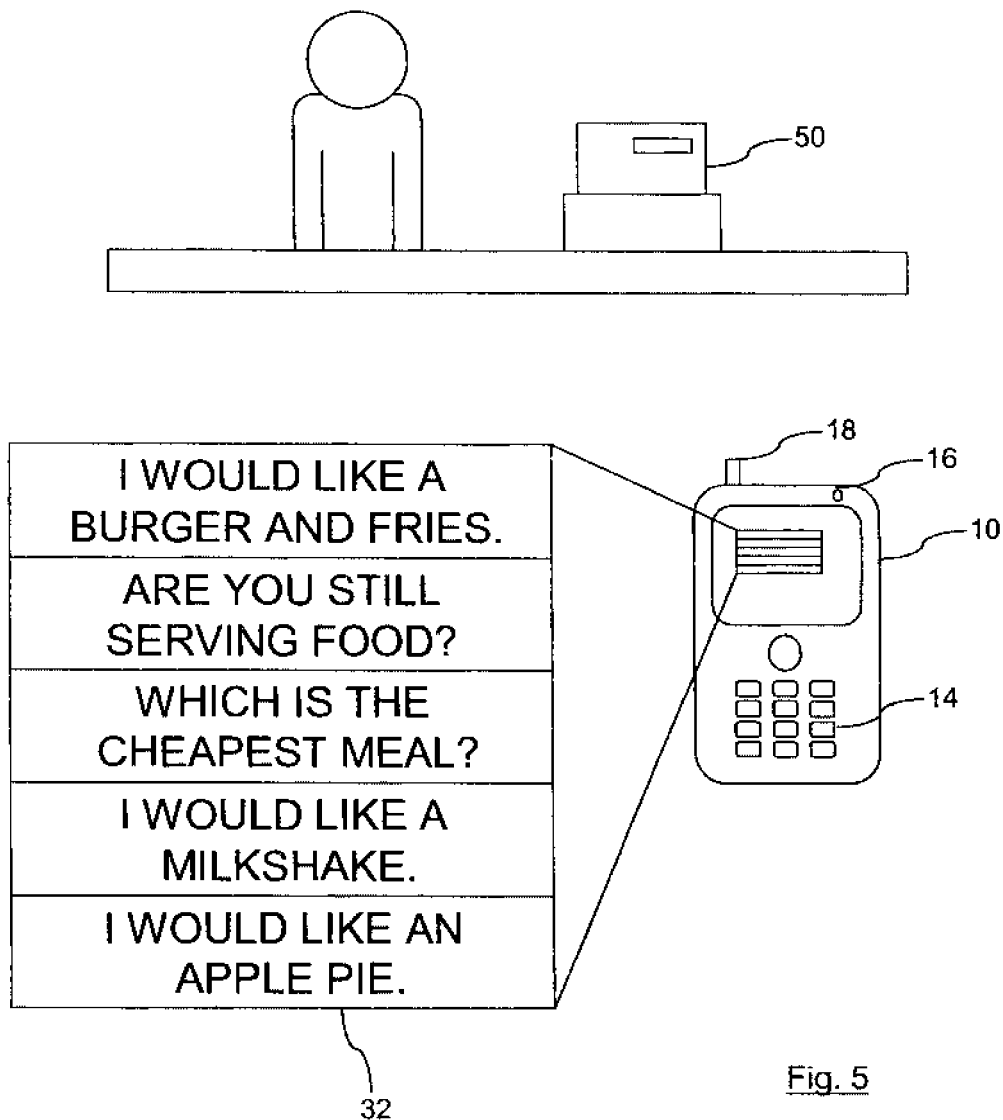
FIG. 5 is a schematic diagram of the communication device in a fast food restaurant.

FIG. 5 shows an example of the device 10 in use in a fast food restaurant. Using the location determining function of the GPS unit 24, the processor 20 has determined a location qualifier 34 for a fast food restaurant and used this to select the displayed language components 32. The functionality of the device 10 can end at this point, but in a more advanced version of the device 10, the user can via the user interface 14 select one of the displayed sentences 32.

The audio output means 16 can output an audio signal corresponding to the specific language component 32 chosen by the user, in response to the user input at the user interface means 14. Alternatively, or in addition, the wireless transmitting means 18 can output a wireless signal corresponding to the chosen language component 32 in response to the user input at the user interface means 14. When the wireless capability is used, the user choice may correspond to an order for food (in this context), and the chosen sentence will be transmitted to a till 50 provided by the fast food establishment as the appropriate food order. This facilitates the communication from the user.

The storing of the language components 36 in the database 22 can be organised in terms of 'zones' where a zone can be a location or a set of related locations. For example, a user can step onto a bus, faced with the bus driver. The device 10, with its GPS device 24, can locate the user at a bus stop in Westminster. The device 10 accesses the bus stop zone and narrows the list of relevant language components 32 down to bus-related generic ones: "Does this bus goes to {x}?" and "A single to {y} please,". The device 10 generates the list using place names around Westminster, for example "Does this bus goes to Hammersmith?". The user is able to select the sentence using the user interface 14 on the device 10. The device 10 asks the bus driver in perfect spoken English for a ticket.

The database 22 can be divided into 'zones' (tables), each zone is for a relevant place and inside it are relevant qualifiers and possible sentences that are appropriate to that zone. New zones can be added easily by users through manual input or application of provided table updates. A set of zones could include such things as; TAXI_RANK, RESTAURANT, TRAIN_STATION, BUS_STOP, SUPER_MARKET. A zone may have many possibly language components. Each component (sentence) includes a link to a location, based upon association, which effects the positioning in any list of components provided to a user. This association can be learned over time, based on where a component is used. The frequency of use raises the level of association with the location in which it is used.

The list of relevant sentences can be narrowed further, for example, by the device 10 identifying that the user is standing on the side of the road that heads into, not away from, Hammersmith, and narrows the list of relevant sentences to only places in Hammersmith. Equally the device 10, via the wireless interface, can contact and download from an external provider either a list of relevant sentences from the provider, or the necessary information and generates relevant sentences.

Any external provider can send a list of any required qualifiers, which the device 10 gathers and sends back to the provider, the provider can then calculate the list of relevant sentences using the qualifiers, and send them back to the device 10. For example, the bus company provider can send a list of required qualifiers (for example, location, time, direction) which the device 10 returns and, then, with the qualifiers, the bus company provider looks up the timetable in real time and returns relevant sentences.

This can be extended further. The device 10 can send, alongside with qualifier data, the sets of qualifiers that the device 10 wants back from the external provider. For example, as above, but the device 10 tells the provider that it wants just the location qualifier, which is the places to which the bus goes. The provider looks up the timetable, gathers all the place names, and then sends them back. The device 10 then produces sentences of its own. Alternatively the device 10 could ask for times as well as places, in order to produce sentences like "Will we arrive in Hammersmith at 10.34 pm?" where 10.34 pm is gathered from the timetables.

In other situations, the device 10 can interface with data drawn from third parties in other ways. For example, when a user walks into a take away establishment, the GPS component 24 compares the location with a map provided by an independent party (for example by accessing data on a yellow pages style website), and learns that the user is in a fast food restaurant. Consequently the device 10 looks up for relevant sentences relating to a fast food restaurant and other qualifiers (for example, summer means ice cream). "A fast food restaurant" is a generic zone, but for specific brands and large companies they can be defined as separate zones. The database 22 can have information about specific branded products, and accordingly generate sentences that are brand specific to assist the user.

The database 22 can be provided by an independent party, such as a public body such as a council, or provided through the Internet by a user community, where algorithms, rules, and information can be downloaded as packs. The database 22 can also be provided by the commercial organisations. This has the advantage that the chain is made accessible to those who are unable to speak English, and therefore address the problems of non-native language speakers.

The wireless capability of the device 10 can also be utilised locally to receive information from service providers. For example, a user walks into a restaurant, one of a big chain, and this restaurant provides data through a wireless access point. My device 10 is told it is inside a specific brand of restaurant and is uploaded with the menu, each menu item links to a suitable set of sentences that can be used to order that item. The user can show the screen 12 of the device 10 to the person behind the till who reads the order. Alternatively, the store provides a fast service till that takes orders directly from the device 10. The user walks up, having made a selection, and presses 'order' resulting in the order being communicated directly to the till.

The same technology can be used to provide information to a Braille device that can be used by the blind to easily find/pick context relevant information such as menus/special offers etc. The output from the device 10 can be either directly from the display 12 of the device 10, or can be passed to another device such as a Braille device, or a combination of these two outputs can be used.

The device 10 can also be used as a language learning tool; a personal teacher. This means that a student can go anywhere, and get a list of things they're likely to want to say or ask—the device 10 gives the student a list of sentences they would normally use using the information the device 10 has stored, in a similar manner to the examples above.

These examples show that by using easily available context information about location and time of day, some intelligent choices can be processed to grant a significant improvement of independence to those that would otherwise struggle to communicate in every day situations.

This technology helps both those who a) do not know what to say (can't speak the native language, can't see the options) b) know what to say but can't say it, allowing them to quickly and efficiently get the message across either visually or audibly with the use of the device 10 in combination with technology like voice synthesizer and text display.

The processor 20 can operate the method of FIG. 4 in a wide variety of different ways. Below are described implementations of the working of the device 10 including pseudocode logic for the processing that would need to be executed to narrow the possibilities to a manageable and navigable set of options.

Algorithms

Algorithm A

1. Get qualifiers.

2. Run the qualifiers through a function, which returns a list of zones that are prioritized. For example: Specific brand->fast-food restaurant->restaurant->business property->building->town.

This produces a prioritized list representing aspects of standing outside a specific place, the top of the list are specific things to do with interacting inside the specific brand of restaurant. The context, however, maybe that it's just a recognizable landmark and the user is lost, such that 'building' would allow the device 10 to produce questions like "where is <to select>?" for when the user is presumably lost. Likewise for town, the device 10 can produce questions like "where is <to select>?" for a list of important places in the town when the user is in town, and when the user is in the countryside, the device 10 would be referring to landmark places in the countryside (like walk routes, picnic areas, nearest pub, and towns in the locality).

3. For each of the zones, starting with the highest prioritized one (the restaurant brand in the above example), run brand (qualifiers) where list of brand-related sentences would be generated using the qualifiers. Such a function can be as simple as:

```
sentences brand(qualifiers) {
    sentences = select all from database where zone=brand and qualifiers
    return sentences
}
```

The remaining qualifiers are passed for the purpose of narrowing down the sentences returned. For example, the database 22 would return nothing if the device 10 knows that the time is 4 am. Of course, the next zone can be tried for any relevant sentences, for example, down to building when you get language components such as "where's the station?" and so on being returned.

Algorithm B

Step 3 above is a "simple" system using the foundation as explained above. The same foundation can be used by advanced systems utilizing more intelligent algorithms like the following generic algorithm:

```
if qualifiers.time >= 3am and <= 4am AND zones.list( ).contains(office) {
    // being at the office at 4am would restrict/cause additional
    scenarios to become likely so add them
    add to language component list:
        "Where is the police?"
        "Where is the taxi zone?"
        etc.
}
```

Algorithm C

The device 10 can produce "zones=branded establishment->fastfood restaurant . . . " (a prioritised list) as one of the qualifiers, so removing the need for a separate function for each zone.

```
sentences getSentences(qualifiers) {
    sentences = select all from database where qualifiers
    return sentences
}
```

This would also allow more advanced selecting, using two or more zones in the list—for example, "car park->...->town" and "car park->...->countryside" where the "town" and "countryside" information would help the function dealing with "car park". The resultant query would produce a hierarchical list of options, that would start at the level of zones, allowing the user to select the one most relevant, then moving to a selection of actual sentences most applicable to that zone. This provides a two-step navigation to reach context relevant options.

The qualifiers 34 used by the processor 20 can be, amongst many others:

CURRENT_TIME

DATE—on Saturdays, the user will most likely not want to go to work locations or offices as they would be closed. Similar considerations would apply on bank holidays, personal holiday and so on.

MOBILE_CELL_LOCATION—fairly accurate location determination.

GPS_LOCATION—very accurate determination of location.

KNOWN_PREFERNCES

SELECTION_HISTORY—what the user did last and what the user did last time they were at a specific location or at this time.

FREQUENCE_OF_USE

CHARACTERISTICS—the user is a vegetarian and therefore doesn't want meat options listed in a restaurant.

WHO_YOU'RE_WITH—by using a short range wireless link such as Bluetooth or similar, the device 10 can identify a person accompanying the user, and thus narrow the list based upon activities undertaken with this person.

DIRECTION_OF_TRAVEL

LAST USE_for example, if a user has just used the device to give a taxi driver instructions, then it is likely that the next need will be to communicate payment.

The database 22 also contains a list of specific places, locations and the zone they apply to. These can be pre-programmed, downloaded or the user can program them manually. As an example of the latter possibility, if a user were, for example, standing at a local taxi rank, the user can select 'store location' following prompts. The user is able to give it a name, for example "Westminster station taxi rank" and define it as zone of the type 'TAXI_RANK' (selectable from a menu), and give it a time relevance of ANY. Utilizing GPS, or similar location technology, the device 10 stores the coordinates of this location.

Similarly, in a favourite restaurant the user can mark that location, attach to the location the zone 'RESTAURANT', and define a time relevance of 12 pm to 11 pm (it's opening hours) and KEY_TIMES of 12 pm to 2 pm and 7 pm to 10 pm (lunch and dinner). Other 'locations' can be added by third parties, such as the local council, or a business. For example, a user can enter a train station and via Bluetooth/wireless scan for location information. Such information is available and the device 10 downloads the details for this location, and it's 'ZONE'. The device 10 can also at the same time update the zone of TRAIN_STATION with any language components relevant to this location.

The language components 36 stored by the database 22 can also include associated information about the specific relevance of the component. Included in this information is a list of related selections that would naturally follow from the specific component. For example, the component "Please could you take me to Hammersmith" in the TAXI_RANK table could link to the component "How much do I owe you?".

Selections can also have time relevance associated with them (for example between 9 am and 5 pm). Historical usage, such as a list of the times/places that this selection has been used before can also be accumulated and stored for each and all components. This helps to build a profile over time to aid prioritization based on personal use. Likewise, the frequency of use to aid relative positioning with other selections under the same qualifiers can be monitored to improve performance of the selection of the language components by the processor 20 of the communication device 10.

The invention claimed is:

1. A method for execution by a communication device, the method comprising:
   determining, using a global positioning system receiver in the device, a location of the device;
   accessing information stored in the device to determine an entity type located at the location of the device;
   accessing a database of language components stored in the device, each of the language components being associated with at least one entity type, said language components comprising information enabling communication with an entity type; and
   presenting to the entity type located at the location of the device a selected at least one language component associated in the database with the entity type located at the location of the device.

2. The method according to claim 1, wherein said presenting includes displaying the selected at least one language component.

3. The method according to claim 1, wherein said presenting includes:
   receiving a user input corresponding to a specific language component associated in the database with the entity type located at the location of the device; and
   outputting an audio signal corresponding to the specific language component.

4. The method according to claim 1, wherein said presenting includes:
   receiving a user input corresponding to a specific language component associated in the database with the entity type located at the location of the device; and
   outputting a wireless signal corresponding to the specific language component.

5. The method according to claim 1, further comprising, when selecting a plurality of language components ordering the selected plurality of language components according to at least one predetermined parameter.

6. A computer program product on a non-transitory computer readable medium comprising computer instructions, the computer instructions when executed by a communications device perform a method comprising: determining a location of the device; determining an entity type located at the location of the device; accessing a database of language components, each of the language components being associated with at least one entity type, said language components comprising information enabling communication with an entity type; and presenting to the entity type located at the location of the device a selected at least one language component associated in the database with the entity type located at the location of the device.

7. The computer program product according to claim 6, wherein the presenting includes displaying the selected at least one language component.

8. The computer program product according to claim 6, and further comprising computer instructions for receiving a user input corresponding to a specific language component associated in the database with the entity type located at the location of the device and said presenting includes outputting an audio signal corresponding to the specific language component.

9. The computer program product according to claim 6, and further comprising computer instructions for receiving a user input corresponding to a specific displayed language component associated in the database with the entity type located at the location of the device and said presenting includes outputting a wireless signal corresponding to the specific language component.

10. A communication device, which comprises:
   a database, said database containing a plurality of language components, each of said language components being associated with at least one entity type, said language components comprising information enabling communication with an entity type;
   means for determining a location of said device;
   means for determining an entity type located at said location of said device;
   means for searching said database for language components associated with the entity type located at said location of said device; and,
   means for presenting one of the language components associated with the entity type located at said location of said device to the entity type located at the location of said device.

11. The communication device as claimed in claim 10, wherein said means for presenting one of the language components includes a visual display.

12. The communication device as claimed in claim 10, wherein said means for presenting one of the language components includes an audio output device.

13. The communication device as claimed in claim 10, wherein said means for presenting one of the language components includes a wireless signaling device.

14. The communication device as claimed in claim 10, including:
   means for presenting to a user of said device the language components associated with the entity type located at said location of said device; and,
   means for enabling said user to select one of said language components associated with the entity type located at said location for presentation to said entity type.

15. The communication device as claimed in claim 14, including:
   means for ordering the language components presented to the user according to at least one predetermined parameter.

16. The communication device as claimed in claim 14, including:
   means for presenting to said user language components associated with the entity type located at said location filtered according to a qualifier in addition to location of said device.

17. The computer program product according to claim 14, further comprising computer instructions which, when executed by the communication device, order the plurality of language components associated in the database with the entity type located at the location of the device according to at least one predetermined parameter.

* * * * *